Dec. 2, 1958
T. W. VAN ZELST, JR
2,862,620
SIEVE SHAKER APPARATUS
Filed May 6, 1957
2 Sheets-Sheet 2
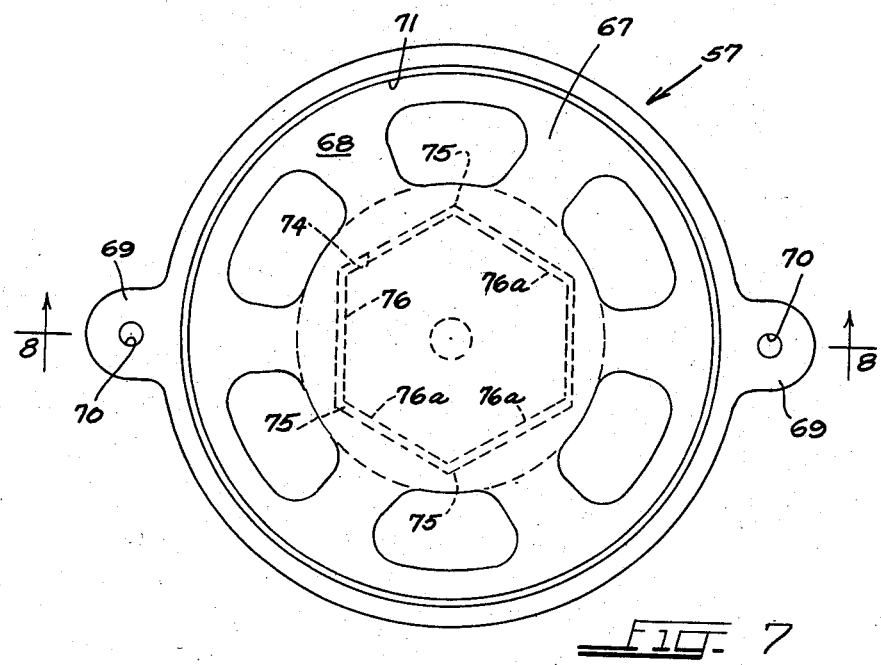
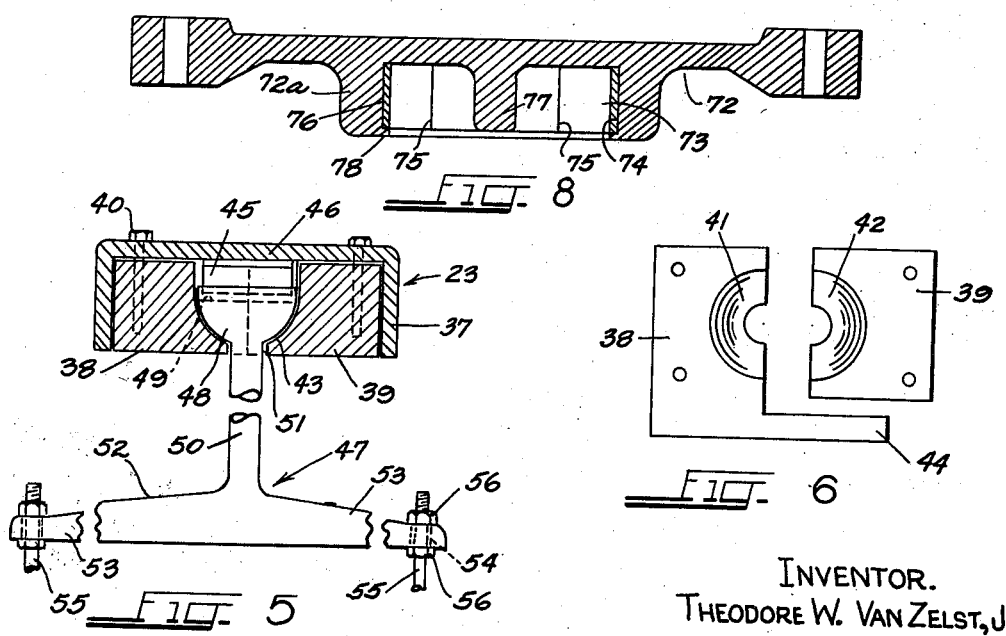
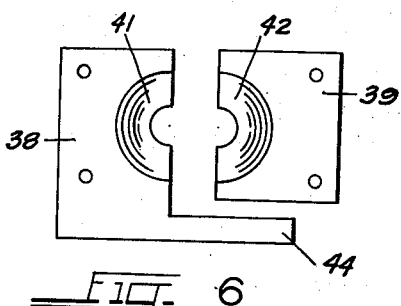
INVENTOR.
THEODORE W. VAN ZELST, JR
BY
Kegan and Kegan
ATTYS.

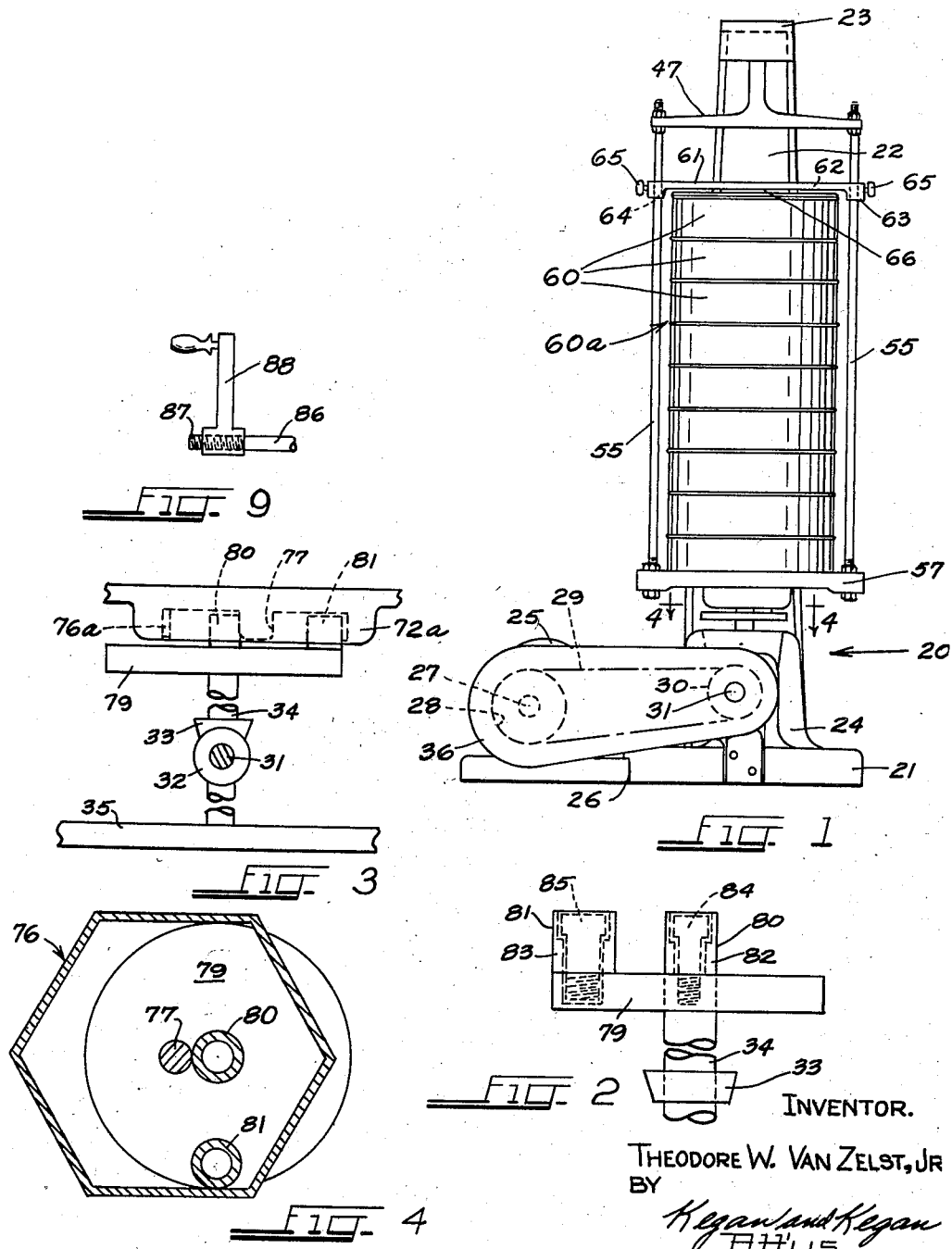

United States Patent Office 2,862,620
Patented Dec. 2, 1958

2,862,620

SIEVE SHAKER APPARATUS

Theodore W. Van Zelst, Jr., Wilmette, Ill., assignor to Soiltest, Inc., Chicago, Ill., a corporation of Illinois Application May 6, 1957, Serial No. 657,115

11 Claims. (Cl. 209—237)

This invention relates to testing equipment for comminuted materials; to sifting apparatus wherein a column of sieves by means of gravity and agitation pass and separate such materials according to particle size; and to a novel mechanism by which the sieve column and the comminuted material therein experience rotary, sidesway and impact actions to facilitate agitation and flow of the material and thereby produce accurate test results in a minimum of time.

In order to test and analyze comminuted materials, such as sand, gravel and cement, the materials initially are placed in the uppermost of a column of sieves, each of which has a screen partition which enables passing at its bottom wall of the material to the sieve immediately therebelow. The screens are arranged, from top to bottom, in decreasing fineness, whereby each sieve retains that materail which cannot pass through its respective screen. By determining that portion of the material which passed through all sieves to the bottom one thereof, and by determining that portion of the material which remains behind in the other sieves, it is possible to analyze gram size distribution in a sample, whether the material so tested meets certain prescribed standards, and further to separate a sample by particle sizes.

Experience has shown, however, that depending solely upon gravity for passing the material from sieve to sieve is not enough, since the material particles quickly tend to pile up over the screens without allowing smaller particles to pass therethrough. Consequently, the sieve column must be agitated to continuously stir and redistribute the particles within the sieves. Even agitation is not sufficient if the particles tend to adhere to each other and the sieve sides, such as occurs when the particles are wet. In such cases, tapping or jarring of the sieves and their contents is necessary in order to separate the adhering particles.

Various types of sieve shaker apparatus, of course, have been known for some time. Some impart a reciprocating or oscillating motion to the sieve column, and cause a tap or impact to be imparted thereto at each end of the column stroke. However, more often than not, these single impacts are not sufficient to separate the adhering particles properly. Another known form of mechanism causes jogging of the sieve column and imparts a tap thereto at the uppermost part of the stroke. Again this tapping action usually is not sufficient to separate most moist materials. Then, there also is a vibrating mechanism which imparts no pronounced tap at all to the sieves, and thus also fails to separate the wet particles thoroughly from each other and the sieve sides and screen. Moreover, the forms of sieves and screens employed are delicate and generally expensive so that care must be taken not to damage them or cause undue wear. Those shakers which allow impacts to be applied directly to the sieve structures wholly fail to give this protection.

In contrast, the present invention contemplates the provision of sieve agitating equipment which not only continuously moves and distributes the material to be analyzed evenly within the sieves and over the screens, but further indirectly imparts to the sieves multiple taps for each cycle of operation to assure proper separation of the materials for screening.

A principal object of this invention, therefore, is to provide improved sieve shaker apparatus which with a maximum of efficiency agitates and shakes the materials under test so as to induce thorough flow from sieve to sieve and thereby produce accurate test results in a minimum of time.

Another object of this invention is to provide for a column of sieves a novel drive which thoroughly agitates the materials within the sieves and further imparts multiple jarrings or tappings thereto during each cycle of operation to assure proper material separation.

Another object of this invention is to provide the material agitation and separation drive in a unique simplified single assembly which is highly efficient and reliable in operation, sturdy in construction and economical to manufacture.

And another object of this invention is to provide support structure for a column of sieves, the structure being adjustable to accommodate any number of a plurality of sieves thereon, and further being arranged to allow proper sieve column movement so as to achieve the desired sieve agitation and shaking actions.

And, still a more specific object of this invention is to provide a novel guide track connectable with a primary drive to both prescribe a predetermined path of sieve column movement for the purpose of material agitation, and control and predetermine the number of tappings imparted to said column during each cycle of drive operation for the purpose of material separation.

These and other objects, advantages and features of construction will become more apparent from a consideration of the following detailed description and the accompanying drawings.

In the drawings:

Figure 1 is a front elevation view of the sieve shaker apparatus with sieves mounted thereon;

Figure 2 is an elevation view of a portion of the drive assembly for said apparatus;

Figure 3 is an elevation view showing the construction of a part of said drive assembly;

Figure 4 is a fragmentary view taken on line 4—4 in Figure 1;

Figure 5 is an enlarged fragmentary and sectional view of the hanger structure comprising the present invention;

Figure 6 is a disassembled plan view of a portion of the same;

Figure 7 is a plan view of the sieve support platform;

Figure 8 is a sectional view taken on line 8—8 in Figure 7; and

Figure 9 is a view of means for manually operating the present invention.

Referring to the drawings, the invention comprises an integral frame 20 including a base 21, a vertical column 22 extending therefrom, and a horizontally disposed arm 23 extending from column 22 adjacent the top thereof. A gear housing 24 also is provided on base 21. Base 21 is formed from cast aluminum, although, of course, other metals may be used equally as well.

In the embodiment of the invention illustrated in Figure 1, a variable speed motor 25 is employed to drive the shaker apparatus. It should be understood, however, that motor 25 may be of the constant speed type, or that a hand crank mechanism may be employed in lieu of an automatic drive. Motor 25 is mounted on an extension 26 of base 21, has fixed thereto a drive shaft 27 on which there is keyed a pulley 28. A belt 29, traveling over pulley 28, connects the same to a second pulley 30 keyed to a horizontal shaft 31 extending into gear housing 24. Shaft 31 carries a bevel gear 32 which meshes a bevel gear 33 carried by a vertical shaft 34. Operation of motor 25, therefore, correspondingly rotatably drives shaft 34. Shaft 34 further carries a flywheel 35 within base 21. A guard 36 is employed to cover pulleys 28, 30, and belt 29.

Referring to Figures 1, 5 and 6, arm 23 includes a channel section 37 in which a pair of socket bearing caps 38, 39, are nestingly mounted by suitable means, such as threaded bolts 40. Caps 38, 39, include oppositely facing circular sectioned socket portions 41, 42, respectively, which provide a hemispherical socket 43 when the caps are mounted on arm 23. Cap 38 further includes a frontal wall 44 intended to overlap cap 39 when the caps are mounted together. A depending elongated key member 45 is fixed to the web 46 of arm 23 directly above socket 43.

A top hanger member 47 is provided with a hemispherical ball shaped portion 48 intended to fit nestingly in socket 43, there further being provided in ball 48 a slot 49 for receiving key member 45 therein when the ball and socket construction is assembled. A stem 50, depending from ball 48 through an opening 51 in socket 43, carries a cross-head 52 including oppositely extending horizontal arms 53—53. The arms 53—53, adjacent the extremities thereof, have holes 54 passing therethrough for receiving the upper ends of tie rods 55—55 which are threaded at their respective upper ends and secured to the arms 53—53 by suitable means, such as nuts 56. Tie rods 55—55 depend to a position slightly above gear housing 24 and at their respective lower ends are threaded and adapted to receive and hold a sieve platform 57 by suitable means.

With platform 57 in position, a plurality of circular sieves 60 may be mounted thereon as desired. In the illustration shown in Figure 1, nine such sieves are shown modularly mounted on the platform to provide a sieve column 60a, although any number may be mounted thereon. To retain the sieves rigidly in place, an adjustable clamp 61 is provided. Clamp 61 includes a cross-member 62 having at each end a sleeve portion 63 with a hole 64 therein for slidingly receiving a tie rod 55. Each sleeve 63 threadably carries a fastener preferably in the form of a thumb screw 65 engageable with its respective tie rod 55 to fix clamp 61 in position. Other forms of fasteners, of course, such as nuts and bolts, or machine screws also may be used. At its lower surface cross-member 62 carries a resilient pad 66 engageable with the uppermost sieve 60. Depending upon the number of sieves 60 on platform 57, clamp 61 is slidably positioned on tie rods 55—55 and brought to bear upon the uppermost sieve, after which clamp 61 is locked by turning the thumb screws 65.

Referring in particular to Figures 7 and 8, platform 57 includes on its upper face 67 a central flat upper surface portion 68 which receives the sieves 60 thereon, and further has opposed lobes 69—69 each of which has a vertical hole 70 therein for receiving a respective tie rod 55. An annular shoulder 71, shaped to the peripheral configuration of the sieves 60, is provided on surface 67 to center the sieves on platform 57 and to facilitate maintaining the sieves thereon.

At its lower face 72 platform 57 includes a concentrically located hub 72a cored to provide an open chamber 73. As distinguished from a smooth continuous wall, the vertical wall 74 of chamber 73 includes corners or interruptions 75 whereat wall 74 changes direction. As shown in Figure 7 the wall and its interruptions are exemplified as providing a hexagonally shaped chamber wherein a similarly hexagonally shaped hardened steel insert 76, having inter-connected wall portions 76a, may be nestingly mounted. A fixed cylindrical guide pin 77 is located concentrically within chamber 73. It is preferred that platform 57 be made of aluminum and that it be cast about insert 76 during the forming to thereby harden the steel during the casting process. An integral retention flange 78 is provided to maintain insert 76 fixed within chamber 73.

Referring to Figures 2 and 4, a vertical shaft 34, at the upper end thereof, carries a crank arm assembly including a disc 79 having a guide roller 80 rotatably mounted coaxially thereon. Disc 79 further rotatably carries a follower roller 81 adjacent its peripheral edge. Rollers 80, 81, respectively include sleeves 82, 83, rotatably held on stripper bolts 84, 85 threaded to disc 79. The sleeves 82, 83, preferably are made from micarta or similar materials having the ability to withstand repeat impacts against wall sections 76a.

As best seen in Figures 3 and 4, disc 79 is so arranged and held on shaft 34 that rollers 80, 81 are positioned within platform chamber 73. In particular, guide roller 80 is engageable with guide pin 77, while follower roller 81 is engageable with the surface of insert wall sections 76a. As disc 79 turns, its guide roller 80 travels about guide pin 77, while follower roller 81 follows about a path described by insert wall sections 76a. Thus, as disc 79 rotates, the rollers cause platform 57 to experience a circular and swaying motion to shake the materials in the sieves 60, while the impact of roller 81 against the wall sections 76a at each insert corner is imparted to the sieves to distribute, separate and loosen the materials being tested.

In operation, the rotary drive of horizontal shaft 31 in turn rotates vertical shaft 34. Rotation of shaft 34 imparts, through the platform drive assembly provided by chamber 73, disc 79 and the rollers carried thereby, first a reciprocating and circular movement to the sieve column 60a, and, second, a jarring or tapping action caused by the impact of roller 81 on wall sections 76a as roller 81 follows its prescribed path of travel in chamber 73. Third, travel of roller 81 further causes platform 57 and its sieve column 60a to experience a certain amount of sway and vertical movement which greatly facilitates shaking of the materials held within the sieves 60. While the ball-joint construction provided for holding hanger 47 permits the sieve column to experience such action, the cooperation between guide pin 77 and guide roller 80, and that between key member 45 and ball slot 49, restricts column movement within certain limits, whereby the column circular and swaying movements to achieve shaking, and the tapping actions, will not get out of hand.

While what has been shown and described is a chamber 73 having an insert 76 of hexagonal shape to thus prescribe a predetermined approximate hexagonal path for roller 81 to follow, it is to be understood that other shaped tracks may be provided, such as those of square, triangular, octagonal, or other geometric configurations, or those wherein the follower travels in a prescribed path and experiences interruptions during its travel to thereby impart the desired tapping, circular or swaying actions to sieve columns 60a.

As seen in Figures 1 and 9 horizontal shaft 31 may be provided with a portion 86 extending through guard 36 and having threading 87 at the outer end thereof. A hand crank 88 then may be removably attached to shaft 31 to permit manual operation when such is desired.

During operation, the movement and impacts which platform 37 and sieves 60 experience prevent undue accumulation of the materials under test at the walls of the sieves, since there is a continual shaking and redistribution of the materials within the sieves, and moreover promote an easy gravity flow of materials from each sieve to the next lower sieve adjacent thereto. It will be observed, of course, that the number of impacts the sieves experience for each cycle of movement of roller 81 depends upon the shape of insert 76 and the track described thereby for roller 81. Thus, for a hexagonally shaped insert, six impacts will be imparted to sieve column 60a for each cycle of roller 81, while for a triangular shaped track only three impacts per roller cycle will be imparted to the sieves. Accordingly, when employing different size sieves in series for various materials, both the speed of the drive mechanism and the track describing the path follower 81 is to follow may be varied correspondingly.

Thus, the herein apparatus provides in a single sieve drive assembly, a sturdy and compact mechanism for shaking, redistributing and jarring materials whereby the materials experience easy gravity flow within a sieve column to produce test results in a minimum of time.

Although what has been shown and described are preferred embodiments of the invention, it is to be understood that these are not intended to be exhaustive nor limiting the invention, but instead are given for the purpose of illustration so that the invention may be better understood, and that others skilled in the art may be able to modify and adapt the invention without departing from the spirit thereof, the scope of which is defined in the appended claims.

What is claimed is:

1. Apparatus for shaking a column of sieves, comprising: a platform for holding a sieve column thereon, means including a ball and socket assembly for pivotally suspending said platform, a crank arm directly below said platform, in juxtaposition thereto, and rotatable in a horizontal plane, means for rotating said arm, a crank pin carried by said arm, an endless track carried by said platform at the bottom thereof and arranged to receive said crank pin therein, said track including a plurality of interconnected sections having at the point of intersection between adjacent sections an abrupt change in track direction, whereby a predetermined path of movement is prescribed for said track and a predetermined number of tappings is imparted to said platform for each cycle of crank arm rotation.

2. The sieve shaker apparatus described in claim 1 wherein said track is arranged in geometric pattern including at least three sections.

3. The sieve shaker apparatus described in claim 1 wherein six sections are arranged to present a hexagonally shaped track, whereby said platform experiences six distinct tappings for each cycle of crank arm rotation.

4. Apparatus for shaking a column of sieves, comprising: a pivot of the ball and socket type, a platform suspended therefrom for the support of a column of sieves, a rotary crank arm below said platform and in justaposition thereto, a guide carried by said arm at the center of rotation thereof, a follower carried by said arm remote from said guide, an open end chamber associated with said platform at the bottom thereof and arranged to receive said guide and said follower therein, said chamber being symmetrical and including at its axis of symmetry a finger engageable with said guide and a plurality of deflector wall sections arrayed about said axis, engageable with said follower and arranged to prescribe both a predetermined path of platform movement and a predetermined number of tappings imparted to said platform as said crank arm rotates with its follower camming against said wall sections.

5. Apparatus for shaking a column of sieves, comprising: an upstanding frame, a platform pivotally suspended therefrom for the support of a column of sieves, a crank arm directly below said platform in juxtaposition thereto, and rotatable in a horizontal plane, means for rotating said arm, a guide roller carried by said arm at the axis of rotation thereof, a follower roller carried by said arm remote from said guide roller, an open end chamber carried by said platform at the bottom surface thereof and arranged to receive said rollers therein, said chamber including a guide pin with which said guide roller is engageable, and a plurality of associated wall sections symmetrically arrayed about said guide pin, engageable with said follower roller and arranged to prescribe for each cycle of crank arm rotation a predetermined path of platform movement and a predetermined number of tappings imparted to said platform as said crank arm follower roller cams against said wall sections.

6. The apparatus described in claim 5 wherein at least three wall sections are symmetrically arrayed about said pin and said platform experiences at least three distinct tappings for each cycle of crank arm rotation.

7. Agitation and tapping apparatus for a column of sieves of decreasing fineness, said apparatus comprising: an integral frame including a base, an upstanding support column, and a forwardly projecting arm adjacent the top thereof; a hanger assembly including oppositely extending arms with rods depending therefrom; a pivotal connection of the ball and socket type suspending said hanger assembly from said frame arm; a platform supported by said rods; a crank arm directly below said platform and rotatable in a horizontal plane; a guide roller carried by said crank arm adjacent the axis of rotation thereof; a follower roller carried by said crank arm remote from said guide roller; means for rotating said crank arm; an open end chamber carried on the bottom surface of said platform, arranged to receive said rollers therein, and comprising a plurality of wall sections engageable by said follower roller as the same rotates, each of said wall sections being obliquely arranged with respect to sections immediately adjacent thereto to thereby provide abrupt intersections whereat said follower roller imparts tappings to said platform, and a fixed pin located medially in said chamber and cooperatively engageable with said guide roller to restrict platform movement within a prescribed path.

8. Testing apparatus wherein rotary agitation and multiple jolts are imparted to a sieve column thereby to continuously distribute and separate materials being tested, said apparatus comprising: an upstanding frame having a pivot of the ball and socket type at the top thereof; a hanger suspended from said pivot; a pair of depending rods carried at opposed ends of said hanger; a platform carried by said rods adjacent the bottoms thereof, and adapted to support said sieve column on its upper surface; an adjustable clamp carried by said rods and arranged to secure said sieve column on said platform; a crank arm positioned directly below said platform, in juxtaposition thereto, and rotatable in a horizontal plane; an upstanding follower carried by said arm; an upstanding guide carried by said arm less remote from the axis of rotation thereof than said follower; means for rotating said crank arm; an open end chamber integral with said platform on the bottom surface thereof, having a centrally positioned fixed pin, and arranged to receive said guide and said follower within the chamber confines whereby, as said guide travels about said fixed pin, said follower is engageable with the chamber wall to impart rotary motion to said platform; the chamber wall further including a plurality of distinct sections arranged with respect to each other so that as said follower passes the intersection of adjacent sections it imparts marked jolts to said platform.

9. The apparatus described in claim 8 wherein at least six of said sections are symmetrically arranged about said pin and said follower thereby imparts at least six jolts to said platform during each cycle of crank arm rotation.

10. Testing apparatus wherein rotary agitation and multiple jolts are imparted to comminuted particles being sifted thereby to continuously distribute and separate said particles, said apparatus comprising: a column of sieves arranged from top to bottom in increasing fineness; a platform arranged to receive said sieve column thereon; means for hanging said platform for pivotal movement; a crank arm directly below said platform, in juxtaposition thereto, and rotatable in a generally horizontal plane, a follower carried by said crank arm; a guide carried by said crank arm adjacent the axis of rotation thereof; a track carried by said platform on the bottom surface thereof and arranged to be engageable with said follower; a fixed pin located on said platform bottom surface medially of said track, whereby as said crank arm rotates, said guide travels about said pin, and said follower imparts rotary motion to said platform and the sieves thereon; said track further comprising a plurality of wall sections symmetrically arrayed about said pin in a geometric pattern and arranged with respect to each other so that, as said follower passes the intersection of adjacent sections, the follower imparts distinct jolts to said platform and the sieves thereon.

11. Testing apparatus wherein rotary agitation and multiple jolts are imparted to a sieve column, comprising: a platform pivotally supported from above and arranged to carry a sieve column thereon; a crank arm directly below said platform, in juxtaposition thereto, and rotatable in a horizontal plane; a follower carried by said crank arm remote from the axis of rotation thereof; a track carried by said platform on the bottom surface thereof and arranged to engage said follower therein whereby as said crank arm rotates, said follower imparts rotary motion to said platform; said track further being arranged in a pattern including at least three sections arranged with respect to each other so that, as said follower passes the intersection of adjacent sections, the follower imparts at least three distinct jolts to said platform during each cycle of crank arm rotation.

References Cited in the file of this patent

UNITED STATES PATENTS

| 857,942 | Howard | June 25, 1907 |
| 2,029,848 | Wettlaufer | Feb. 4, 1936 |

FOREIGN PATENTS

| 9,895 | Great Britain | Apr. 27, 1906 |
| 495,667 | Germany | Apr. 10, 1930 |